(12) United States Patent
Tomiyama

(10) Patent No.: US 11,034,301 B2
(45) Date of Patent: Jun. 15, 2021

(54) VEHICLE DOOR MIRROR DEVICE

(71) Applicant: KABUSHIKI KAISHA HONDA LOCK, Miyazaki (JP)

(72) Inventor: Junichi Tomiyama, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 138 days.

(21) Appl. No.: 16/080,751

(22) PCT Filed: Aug. 30, 2017

(86) PCT No.: PCT/JP2017/031185
§ 371 (c)(1),
(2) Date: Aug. 29, 2018

(87) PCT Pub. No.: WO2018/056008
PCT Pub. Date: Mar. 29, 2018

(65) Prior Publication Data
US 2019/0009723 A1    Jan. 10, 2019

(30) Foreign Application Priority Data

Sep. 20, 2016   (JP) .............................. JP2016-182688

(51) Int. Cl.
*B60R 1/072* (2006.01)
*B60R 1/074* (2006.01)

(52) U.S. Cl.
CPC ............... *B60R 1/072* (2013.01); *B60R 1/074* (2013.01)

(58) Field of Classification Search
CPC ........... B60R 1/072; B60R 1/06; B60R 1/062; B60R 1/07; B60R 1/074; B60R 1/076;
(Continued)

(56) References Cited

U.S. PATENT DOCUMENTS 5,467,230 A    11/1995 Boddy et al.
6,132,050 A *  10/2000 Sakata ..................... B60R 1/07
                                                   248/478

(Continued)

FOREIGN PATENT DOCUMENTS

CN    1129427 A    8/1996
JP    H08-34287 A  2/1996
(Continued)

OTHER PUBLICATIONS

Office Action dated Sep. 18, 2020 issued over the corresponding German Patent Application No. 11 2017 000 627.9.

(Continued)

*Primary Examiner* — Marin Pichler
(74) *Attorney, Agent, or Firm* — Carrier Blackman & Associates, P.C.; Joseph P. Carrier; Fulchand P. Shende

(57) ABSTRACT

A vehicle door mirror device includes a mirror housing that has as some of constituent elements thereof a housing main body having fixed thereto an actuator for driving the mirror so as to tilt the mirror in a fore-and-aft direction and a left-and-right direction, a support shaft that is standingly provided on a mirror base mounted on a front side door, and an electric retraction unit that is pivotably supported on the support shaft and is fixed to the housing main body while being housed within the mirror housing so as to exert power for pivoting the mirror housing around an axis of the support shaft between a retracted position and a raised position, wherein fastening directions for fastening members that fasten the electric retraction unit and the actuator to the housing main body are set in the same direction.

4 Claims, 7 Drawing Sheets

(58) Field of Classification Search
CPC ...... B60R 1/025; G02B 7/182; G02B 7/1821; G02B 7/1822; G02B 7/1827
USPC ........ 359/872–874, 876, 877, 841, 843, 844
See application file for complete search history.

(56) References Cited

U.S. PATENT DOCUMENTS

2001/0007515 A1    7/2001  Inagaki et al.
2004/0012867 A1*   1/2004  Sakata .................... B60R 1/074
                                                        359/871

FOREIGN PATENT DOCUMENTS

JP      H08-34288 A     2/1996
JP      2001-322499 A   11/2001
JP      2013-133045 A   7/2013

OTHER PUBLICATIONS

Official Communication dated Dec. 2, 2020 issued over the corresponding Chinese Patent Application No. 201780020781.2.

* cited by examiner

VEHICLE DOOR MIRROR DEVICE

TECHNICAL FIELD

The present invention relates to a vehicle door mirror device that includes a mirror housing that has as some of constituent elements thereof a housing main body having a mirror housing recess part in which a mirror is housed and having fixed thereto an actuator for driving the mirror so as to tilt the mirror in a fore-and-aft direction and a left-and-right direction, a support shaft that is standingly provided on a mirror base mounted on a front side door, and an electric retraction unit that is pivotably supported on the support shaft and is fixed to the housing main body while being housed within the mirror housing so as to exert power for pivoting the mirror housing around an axis of the support shaft between a retracted position and a raised position.

BACKGROUND ART

A vehicle door mirror device in which an electric retraction unit that is pivotably supported by a support shaft standingly provided on a mirror base and an actuator that drives a mirror so as to tilt it are fastened to a housing main body of a mirror housing by a screw member is known from Patent Document 1.

RELATED ART DOCUMENTS

Patent Documents

Patent Document 1: Japanese Patent Application Laid-open No. 2013-133045

SUMMARY OF THE INVENTION

Problems to be Solved by the Invention

In the arrangement disclosed in Patent Document 1 above, the directions in which the screw members used for assembling the electric retraction unit and the actuator onto the housing main body of the mirror housing are operated are not fixed; it is necessary to move a product between the time when the electric retraction unit is assembled onto the housing main body and the time when the actuator is assembled onto the housing main body, and there is a desire for simplification of the steps and an improvement in the workability.

The present invention has been accomplished in light of such circumstances, and it is an object thereof to provide a vehicle door mirror device that can achieve simplification of steps and improvement of workability when assembling an electric retraction unit and an actuator onto a housing main body.

Means for Solving the Problems

In order to attain the above object, according to an aspect of the present invention, there is provided a vehicle door mirror device comprising a mirror housing that has as part of constituent elements thereof a housing main body having a mirror housing recess part in which a mirror is housed and having fixed thereto an actuator for driving the mirror so as to tilt the mirror in a fore-and-aft direction and a left-and-right direction, a support shaft that is standingly provided on a mirror base to be mounted on a front side door, and an electric retraction unit that is pivotably supported on the support shaft and is fixed to the housing main body while being housed within the mirror housing so as to exert power for pivoting the mirror housing around an axis of the support shaft between a retracted position and a raised position, characterized in that fastening directions for fastening members that fasten the electric retraction unit and the actuator to the housing main body are set in the same direction.

Effects of the Invention

In accordance with the aspect of the present invention, since the electric retraction unit and the actuator are fastened to the housing main body by the fastening members operated in the same fastening direction, it is possible to simplify the steps and improve the workability when assembling the electric retraction unit and the actuator onto the housing main body.

EXPLANATION OF REFERENCE NUMERALS AND SYMBOLS

Figure 1:
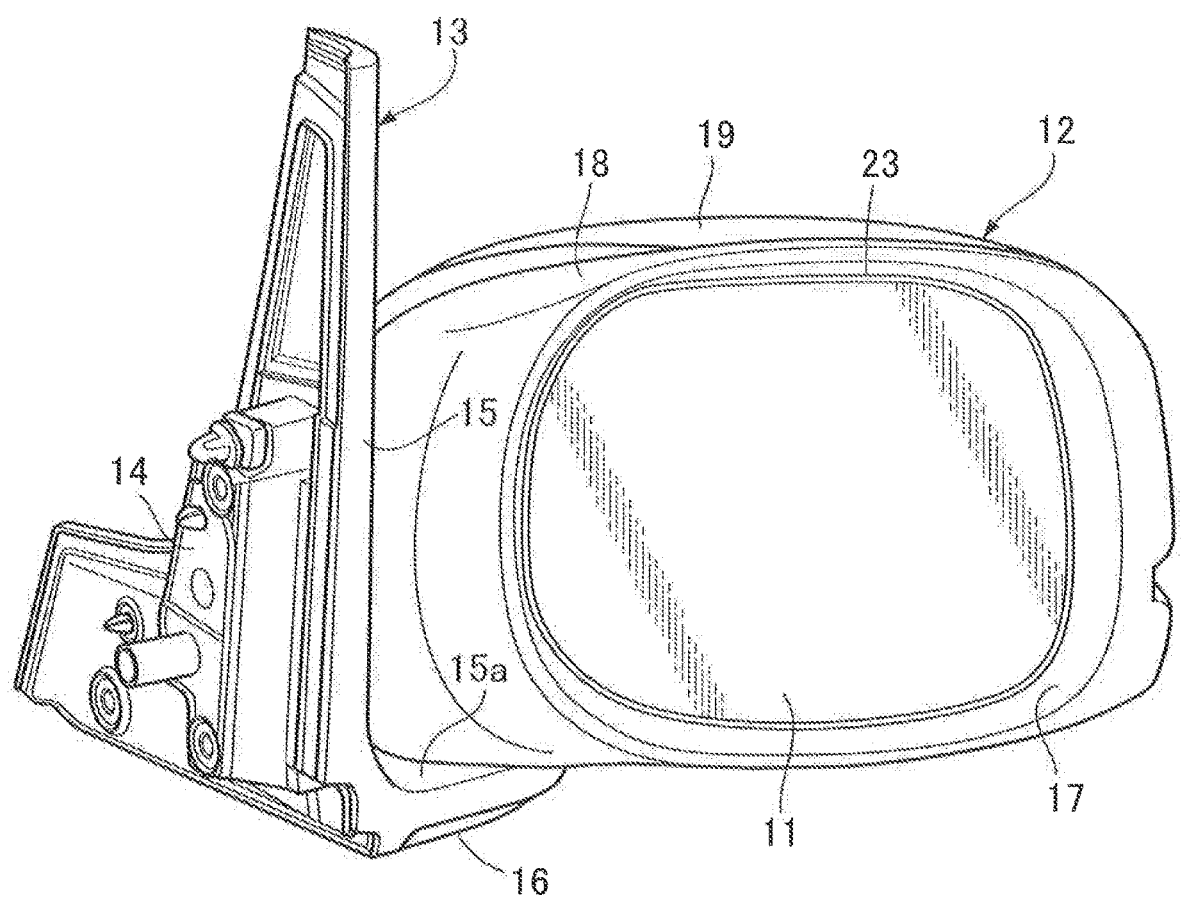
FIG. 1 is a perspective view of a door mirror device when viewed from the rear in the fore-and-aft direction of a vehicle. (first embodiment)

11 Mirror
12 Mirror housing
13 Mirror base
17 Mirror housing recess part
18 Housing main body
24 Actuator
26 Support shaft
27 Electric retraction unit
63, 64 Screw member, which is a fastening member
65 Fastening direction

MODES FOR CARRYING OUT THE INVENTION

An embodiment of the present invention is explained below by reference to the attached FIG. 1 to FIG. 7.

First Embodiment

Figure 2:
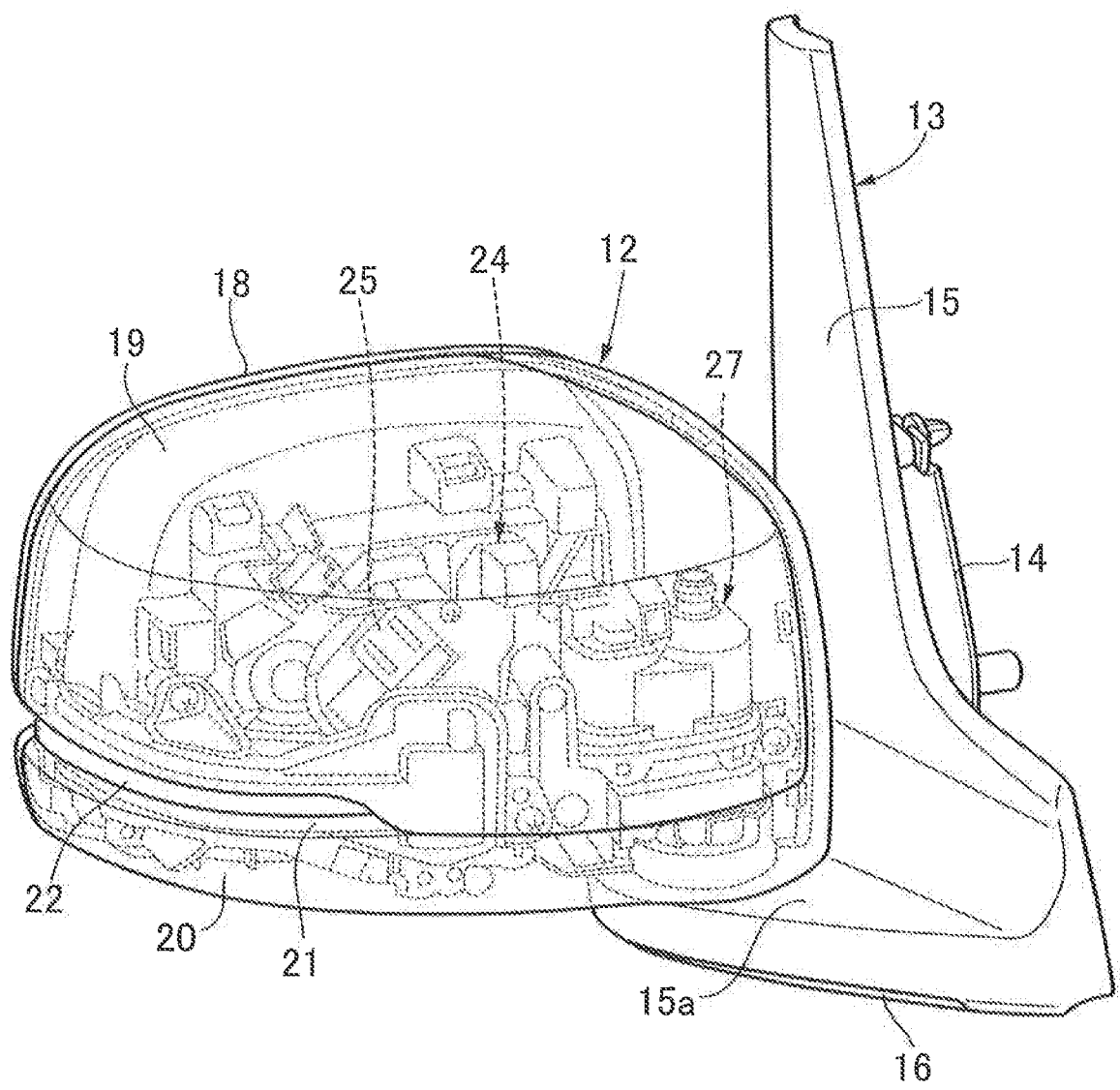
FIG. 2 is a perspective view of the door mirror device when viewed from the front in the fore-and-aft direction of the vehicle. (first embodiment)

First, in FIG. 1 and FIG. 2, a mirror housing 12 into which a mirror 11 is fitted is disposed on left and right front side doors of a passenger vehicle, the mirror housing 12 being capable of pivoting between a raised position in which it projects sideways from the front side door and a retracted position in which it is retracted toward the front side door side.

A mirror base 13 on which the mirror housing 12 is pivotably supported is mounted on the front side door, and this mirror base 13 is formed from an inner base 14 that is die-molded from a light metal and mounted on the front side door and first and second base covers 15 and 16 that cover the inner base 14. The first base cover 15 is formed into a shape that covers the inner base 14 from the outer side while having a support arm portion 15a projecting sideways from the front side door, and the second base cover 16 covers the support arm portion 15a from below and is connectedly provided on a lower part of the first base cover 15.

Figure 3:
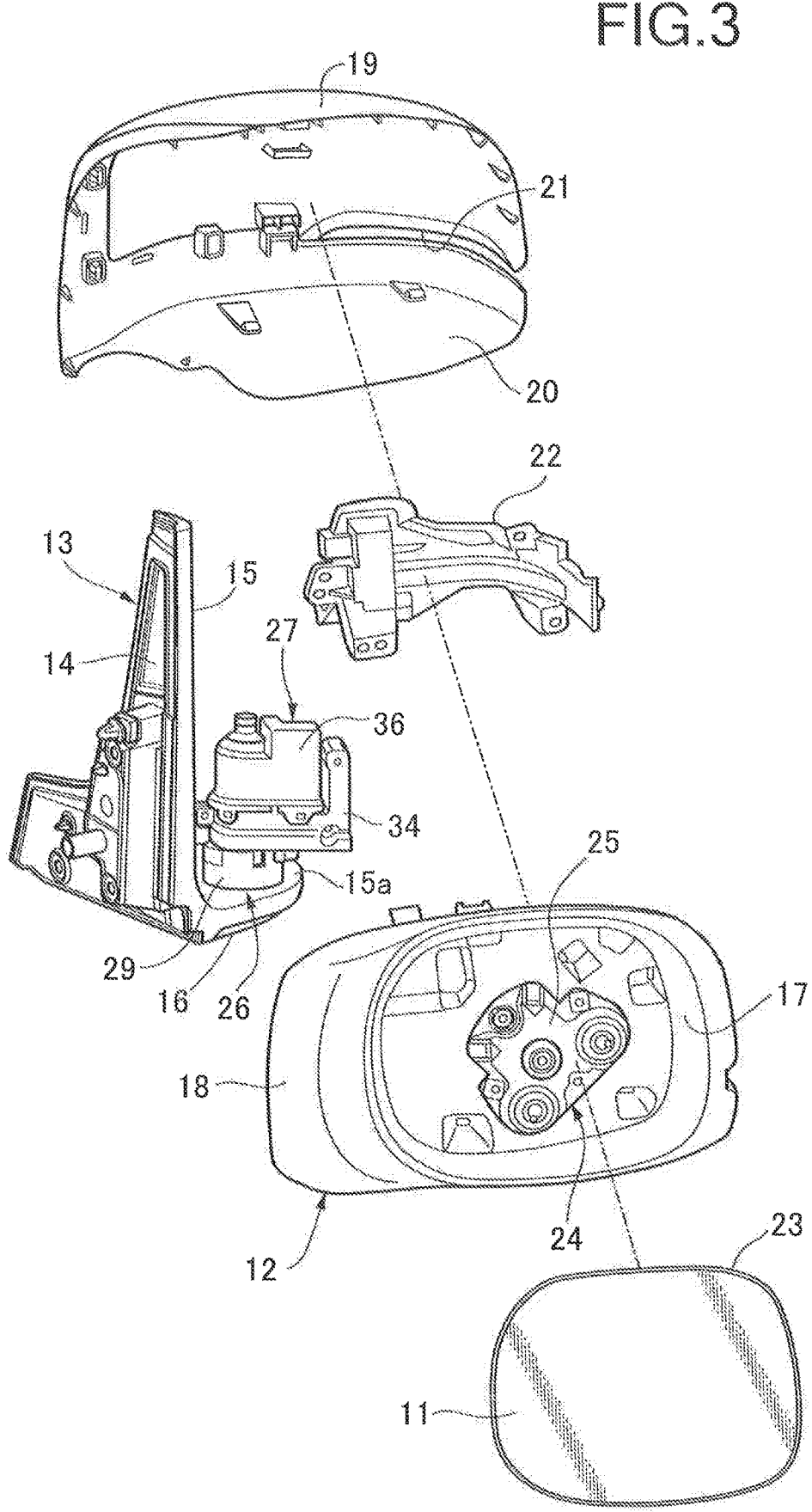
FIG. 3 is an exploded perspective view of the vehicle door mirror device. (first embodiment)

Referring in addition to FIG. 3, the mirror housing 12 is formed from a housing main body 18, made of a synthetic resin, having a mirror housing recess part 17 in which the mirror 11 is housed, an upper cover 19, made of a synthetic resin, covering the housing main body 18 from the direction opposite to the mirror 11, and a lower cover 20 covering a lower part of the housing main body 18 from below. A side turn lamp 22 is disposed in a slit 21 formed between the upper cover 19 and the lower cover 20, the side turn lamp 22 being fastened to the housing main body 18.

The mirror 11, which is for viewing the side to the rear of the vehicle, and a mirror holder 23, made of a synthetic resin, that holds the mirror 11 are disposed in an opening of the housing main body 18, that is, an open end part of the mirror housing recess part 17.

An actuator case 25 of an actuator 24 is housed and fixed within the mirror housing 12 so that part of the actuator case 25 opposes the mirror holder 23. The mirror holder 23 is supported on the actuator case 25 so that it can swing to the left and right in the vehicle width direction and can swing in the vertical direction, and the mirror 11 and the mirror holder 23 are driven so as to swing in response to operation of the actuator 24.

Figure 4:
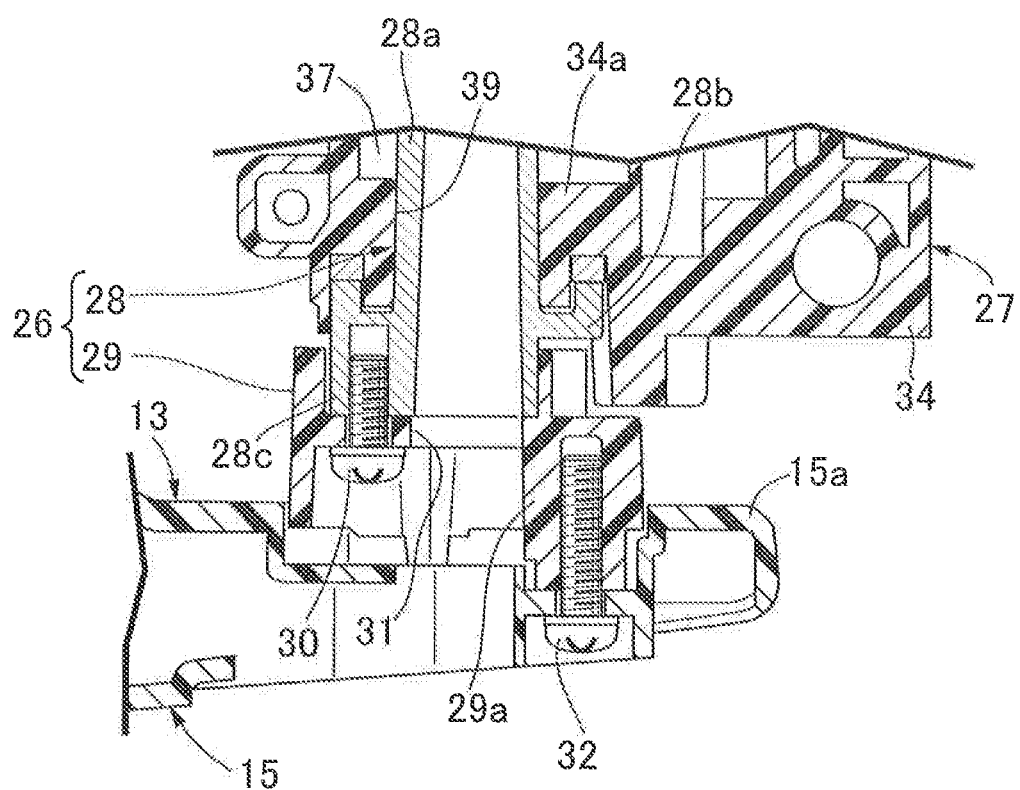
FIG. 4 is a vertical sectional view showing a state in which a support shaft is mounted on a mirror base. (first embodiment)

Referring in addition to FIG. 4, an electric retraction unit 27 is housed within the mirror housing 12; the electric retraction unit 27 is pivotably supported by a support shaft 26 standingly provided on the mirror base 13 and protruding into the mirror housing 12, and the housing main body 18 of the mirror housing 12 is mounted on the electric retraction unit 27. That is, the housing main body 18 is supported on the support shaft 26, which is standingly provided on the mirror base 13 mounted on the front side door, via the electric retraction unit 27, and the mirror housing 12 is pivoted between a raised position in which it projects sideways from the front side door and a retracted position in which it is retracted to the front side door side by operation of the electric retraction unit 27.

The support shaft 26 is formed from a shaft member 28 that is formed from a light alloy such as a zinc alloy, and a mounting member 29, made of a synthetic resin, that is fastened to a lower end part of the shaft member 28. The mounting member 29 is fixed to the support arm portion 15a of the first base cover 15 in the mirror base 13.

The shaft member 28 integrally has a cylindrical shaft portion 28a extending in the vertical direction, a collar portion 28b protruding sideways from a lower part of the shaft portion 28a, and a cylindrical mounting boss portion 28c protruding downward so as to be connected to a lower end part of the shaft portion 28a and the collar portion 28b at three positions equally spaced in the circumferential direction of the shaft portion 28a.

The mounting member 29 is fastened to the mounting boss portion 28c by a screw member 30 while opposing the collar portion 28b of the shaft member 28 from below and is formed so as to face toward the support arm portion 15a of the first base cover 15 from a lower part of the mirror housing 12. A center hole 31 coaxially connected to the shaft portion 28a is provided in the mounting member 29, and three boss portions 29a projecting toward the support arm portion 15a side so as to be disposed between the three mounting boss portions 28c are projectingly provided integrally with the mounting member 29. These boss portions 29a are fastened to the support arm portion 15a by a screw member 32.

Figure 5:
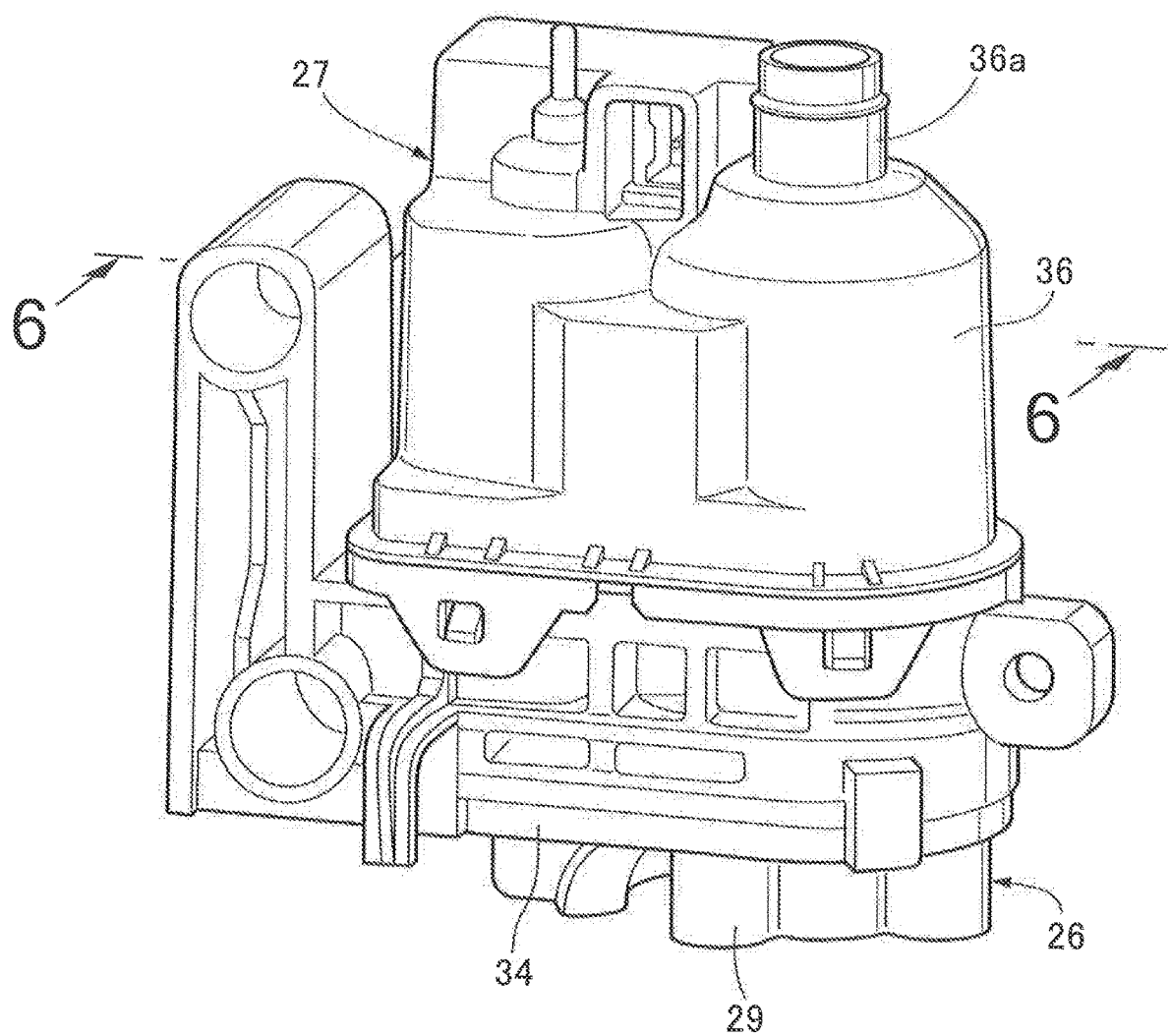
FIG. 5 is a perspective view of an electric retraction unit. (first embodiment)
Figure 6:
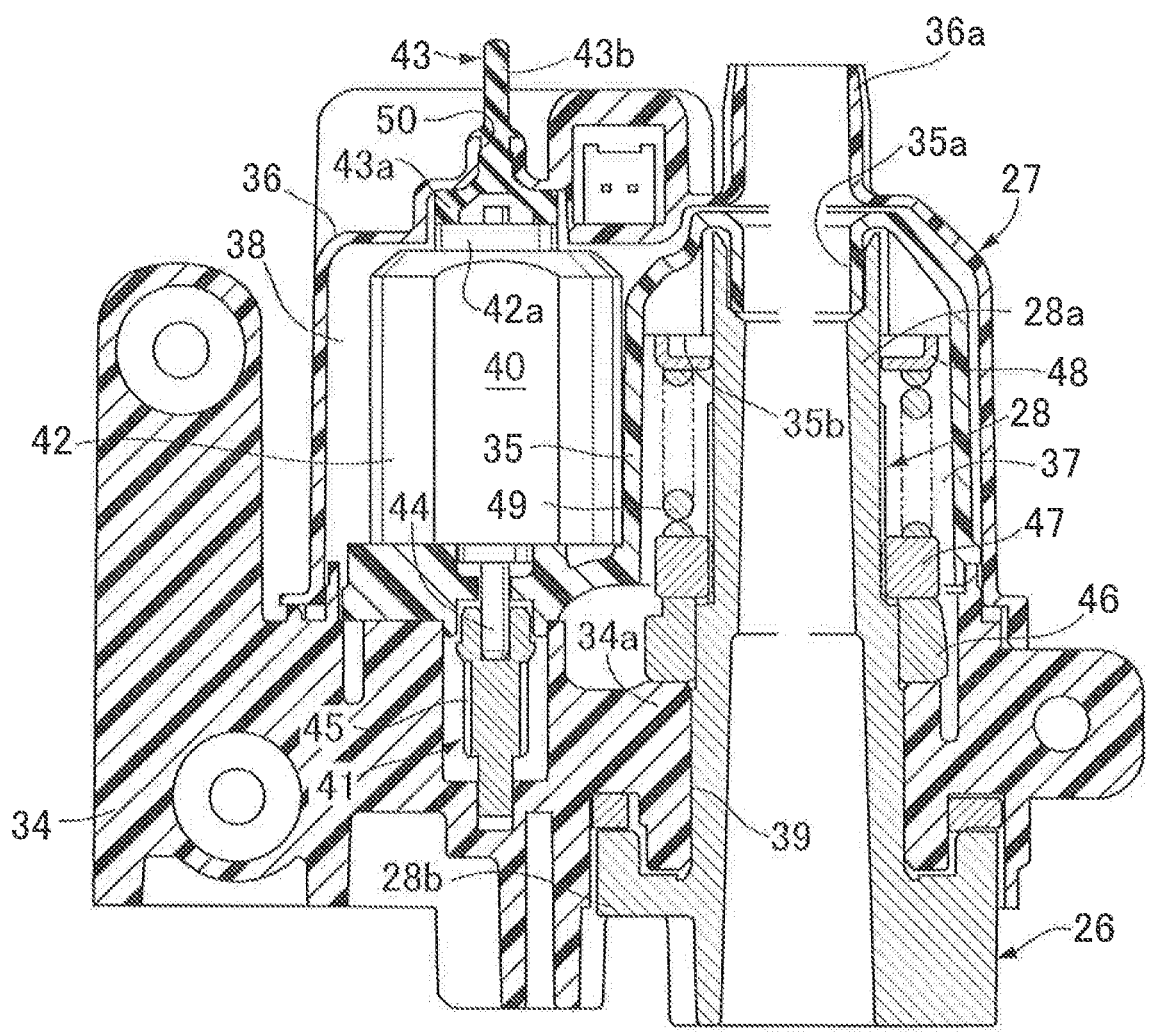
FIG. 6 is a sectional view along line 6-6 in FIG. 5. (first embodiment)

Referring in addition to FIG. 5 and FIG. 6, the electric retraction unit 27 includes a gear case 34 pivotably supported on the support shaft 26, a motor case 35 mounted on the gear case 34, and a motor cover 36 covering the motor case 35 from above.

The housing main body 18 of the mirror housing 12 is fastened to the gear case 34, the motor case 35, which forms a gear chamber 37 between itself and the gear case 34, is joined to the gear case 34 from above, and the motor cover 36 is joined to the gear case 34 while forming a motor chamber 38 between itself and the motor case 35.

A first bearing portion 34a having a support hole 39 through which the shaft portion 28a of the support shaft 26 extends is formed on a lower part of the gear case 34 so as to be pivotably supported by the shaft portion 28a, and the gear case 34 is thrust-supported by the collar portion 28b of the shaft member 28. Furthermore, a cylindrical second bearing portion 35a is formed integrally with the motor case 35, the cylindrical second bearing portion 35a being fitted into an upper end part of the shaft portion 28a so as to be pivotably supported by the upper end part of the shaft portion 28a, and a cylindrical portion 36a is formed integrally with the motor cover 36, the cylindrical portion 36a extending upward so as to coaxially communicate with the upper end of the shaft portion 28a.

An electric motor 40 and a drive mechanism 41 are housed in the electric retraction unit 27. The electric motor 40 exerts power for pivoting the mirror housing 12 around the axis of the support shaft 26 between the retracted position and the raised position, and the drive mechanism 41 is provided between the electric motor 40 and the support shaft 26 so as to pivot the mirror housing 12 around the axis of the support shaft 26 in response to operation of the electric motor 40.

The electric motor 40 has a rotational axis that is parallel to the axis of the support shaft 26 and is housed in the motor chamber 38 between the motor case 35 and the motor cover 36, and the motor housing 42 of the electric motor 40 is sandwiched between the motor case 35 and the motor cover 36 with a cushion 43 formed from an elastic material disposed between the motor housing 42 and the motor cover 36.

The drive mechanism 41 is housed in the gear chamber 37, and has a worm gear 45 that coaxially and relatively non-rotatably provided on a motor shaft 44 of the electric motor 40, a gear train (not illustrated) that transmits rotational power from the worm gear 45, and a clutch gear 46 to which the power of the gear train is transmitted, the clutch gear 46 being rotatably fitted onto the shaft portion 28a of the support shaft 26 while abutting against the first bearing portion 34a.

A clutch plate 47 sandwiching the clutch gear 46 between itself and the first bearing portion 34a is non-rotatably but axially movably fitted on the shaft portion 28a, and a coil-shaped clutch spring 49 is provided in a compressed state between the clutch plate 47 and a retainer 48 that can be received by a receiving portion 35b provided on the motor case 35 at a position close to the second bearing portion 35a.

In a state in which no external force having a predetermined value or greater is acting on the mirror housing 12, the clutch gear 46 is prevented from rotating around the axis of the shaft portion 28a by being sandwiched between the first bearing portion 34a and the clutch plate 47, and when in this state the electric motor 40 operates, the electric retraction unit 27, that is, the mirror housing 12, pivots around the axis of the shaft portion 28a between the retracted position, in which it is retracted toward the front side door side, and the raised position, in which it projects sideways from the front side door.

On the other hand, when an external force having a predetermined value or greater acts on the mirror housing 12, the clutch gear 46 becomes capable of pivoting around the axis of the shaft portion 28a between a rearwardly tilted position and a forwardly tilted position while slipping between the first bearing portion 34a and the clutch plate 47, and the mirror housing 12 can be pivoted manually or the mirror housing 12 can be pivoted by contact with another obstacle. In this embodiment, the rearwardly tilted position is the same position as the retracted position, and the forwardly tilted position is set at a position that is pivoted further forward than the raised position.

The cushion 43 is formed from an elastic material so as to integrally have a cushion main portion 43a that is present between the motor cover 36 and the motor housing 42 and an extending portion 43b that extends hermetically through a through hole 50 provided in the motor cover 36 and protrudes outward.

One end part of the motor shaft 44 protrudes from one end part of the motor housing 42, and the one end part of the motor housing 42 abuts against the motor case 35. On the other hand, a bottomed stepped cylindrical bearing housing 42a is projectingly provided integrally with a center part of the other end part of the motor housing 42, the bearing housing 42a rotatably supporting the other end part of the motor shaft 44, and the cushion main portion 43a of the cushion 43 is sandwiched between the bearing housing 42a and the motor cover 36.

Figure 7:
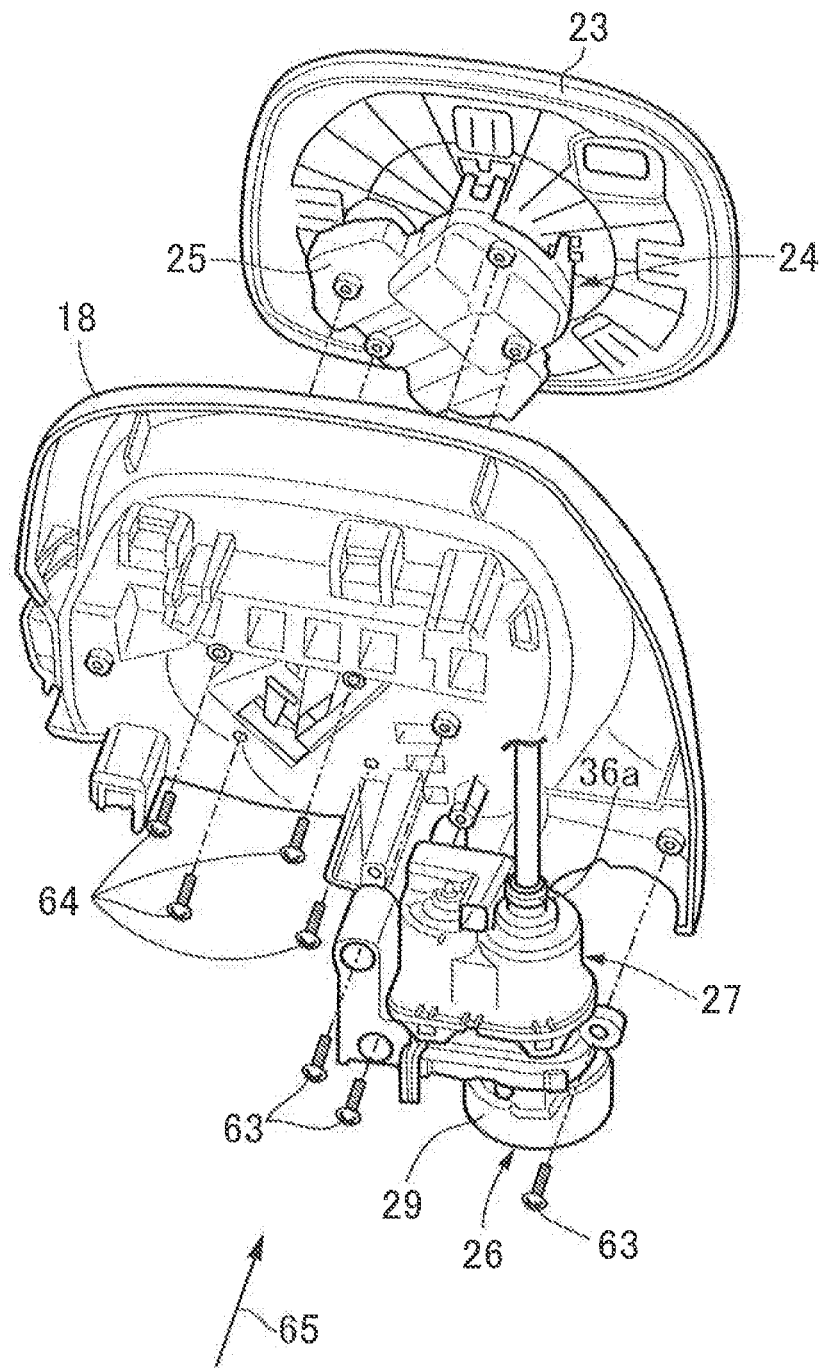
FIG. 7 is a perspective view showing a state in which the electric retraction unit and an actuator are mounted on a housing main body. (first embodiment)

In FIG. 7, the electric retraction unit 27 is fastened to the housing main body 18 of the mirror housing 12 by means of a plurality of, for example three, screw members 63, which are fastening members, and the actuator case 25 of the actuator 24 is fastened to the housing main body 18 by means of a plurality of, for example four, screw members 64, which are fastening members. Moreover, the electric retraction unit 27 is fastened to the housing main body 18 by means of the screw member 63 from the side, opposite to the mirror housing recess part 17, of the housing main body 18, and the actuator 24 is fastened to the housing main body 18 by fastening the screw member 64 from the same direction as a fastening direction 65 for the screw member 63.

When fastening the electric retraction unit 27 to the housing main body 18, the electric retraction unit 27 may have been assembled onto the mirror base 13, or the electric retraction unit 27 in a state in which it is fixed to the housing main body 18 may be assembled onto the mirror base 13. When fastening the actuator 24 to the housing main body 18, the mirror holder 23 in a state in which it holds the mirror 11 may have been assembled onto the actuator 24, and the actuator 24 in a state in which the mirror holder 23 holding the mirror 11 has been assembled thereonto may be fastened to the housing main body 18.

The operation of the embodiment is now explained. Since the fastening directions 65 for the screw members 63 and 64, which fasten the electric retraction unit 27 and the actuator 24 to the housing main body 18, are identical, it is possible to simplify the steps and improve the workability when assembling the electric retraction unit 27 and the actuator 24 onto the housing main body 18.

An embodiment of the present invention is explained above, but the present invention is not limited to the embodiment and may be modified in a variety of ways as long as the modifications do not depart from the spirit and scope thereof.

The invention claimed is:

1. A vehicle door mirror device comprising a mirror housing that has as part of constituent elements thereof
    a housing main body having a mirror housing recess part in which a mirror is housed and having fixed thereto an actuator for driving the mirror so as to tilt the mirror in a fore-and-aft direction and a left-and-right direction,
    a support shaft that is standingly provided on a mirror base to be mounted on a front side door, and
    an electric retraction unit that is pivotably supported on the support shaft and is fixed to the housing main body while being housed within the mirror housing so as to exert power for pivoting the mirror housing around an axis of the support shaft between a retracted position and a raised position,
    wherein fastening directions for fastening members that fasten the electric retraction unit and the actuator to the housing main body are set exclusively in the same direction;
    wherein the actuator and the electric retraction unit are fastened to the housing main body separately and the fastening directions of the electric retraction unit and the actuator to the housing main body are maintained in the same direction;
    wherein the electric retraction unit and the actuator are each directly fastened to the housing main body;
    wherein the housing main body is arranged between the actuator and the electric retraction unit; and
    wherein all the fastening members that fasten the electric retraction unit to the housing main body and all the fastening members that fasten the actuator to the housing main body are arranged parallel to each other.

2. The vehicle door mirror device according to claim 1, wherein the electric retraction unit is fastened to the housing main body by using a first set of the fastening members, and the actuator is fastened to the housing main body by using a second set of the fastening members, which is separate from the first set of the fastening members.

3. The vehicle door mirror device according to claim 1, further comprising a mirror holder attached to the actuator, said mirror holder being configured to hold the mirror;
    wherein the actuator and the electric retraction unit are fastened to the housing main body such that the fastening of the actuator to the housing main body includes the mirror holder in a state in which it holds the mirror being assembled onto the actuator, and the actuator in a state in which the mirror holder holding the mirror has been assembled thereon being fastened to the housing main body, and the fastening of the electric retraction unit to the housing main body includes one of the electric retraction unit being assembled onto the mirror base, and the electric retraction unit in a state in which it is fixed to the housing main body being assembled onto the mirror base.

4. A vehicle door mirror device comprising a mirror housing that has as part of constituent elements thereof
- a housing main body having a mirror housing recess part in which a mirror is housed and having fixed thereto an actuator for driving the mirror so as to tilt the mirror in a fore-and-aft direction and a left-and-right direction,
- a support shaft that is standingly provided on a mirror base to be mounted on a front side door, and
- an electric retraction unit that is pivotably supported on the support shaft and is fixed to the housing main body while being housed within the mirror housing so as to exert power for pivoting the mirror housing around an axis of the support shaft between a retracted position and a raised position,
- wherein fastening directions for fastening members that fasten the electric retraction unit and the actuator to the housing main body are set exclusively in the same direction;
- wherein the actuator and the electric retraction unit are adapted to be fastened to the housing main body simultaneously while maintaining the fastening directions of the electric retraction unit and the actuator to the housing main body in the same direction;
- wherein the electric retraction unit and the actuator are each directly fastened to the housing main body;
- wherein the housing main body is arranged between the actuator and the electric retraction unit; and
- wherein all the fastening members that fasten the electric retraction unit to the housing main body and all the fastening members that fasten the actuator to the housing main body are arranged parallel to each other.

* * * * *